W. J. MACKLE.
MECHANICAL MOVEMENT.
APPLICATION FILED NOV. 14, 1919.
1,369,256.
Patented Feb. 22, 1921.
3 SHEETS—SHEET 1.
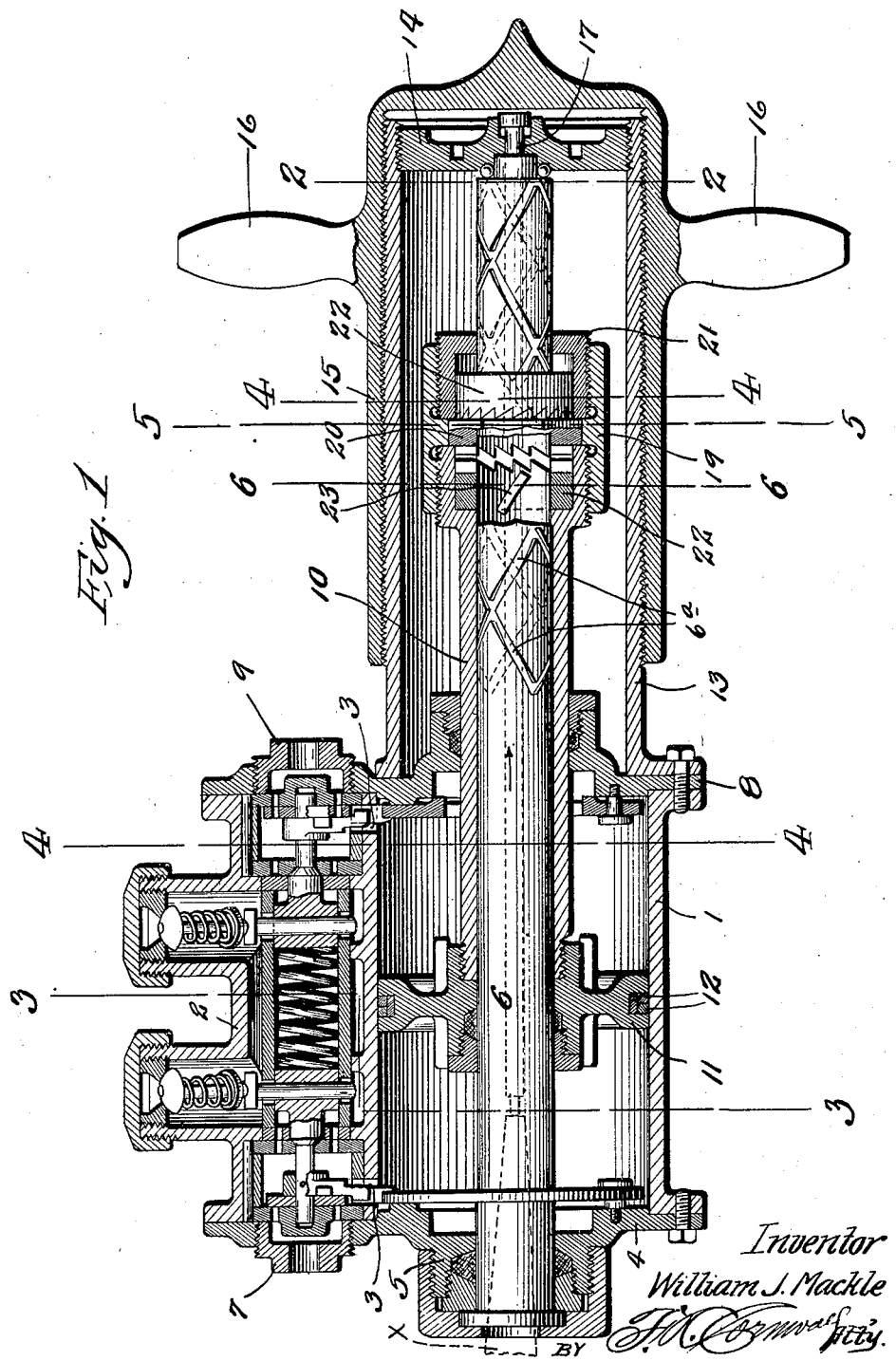
Inventor
William J. Mackle

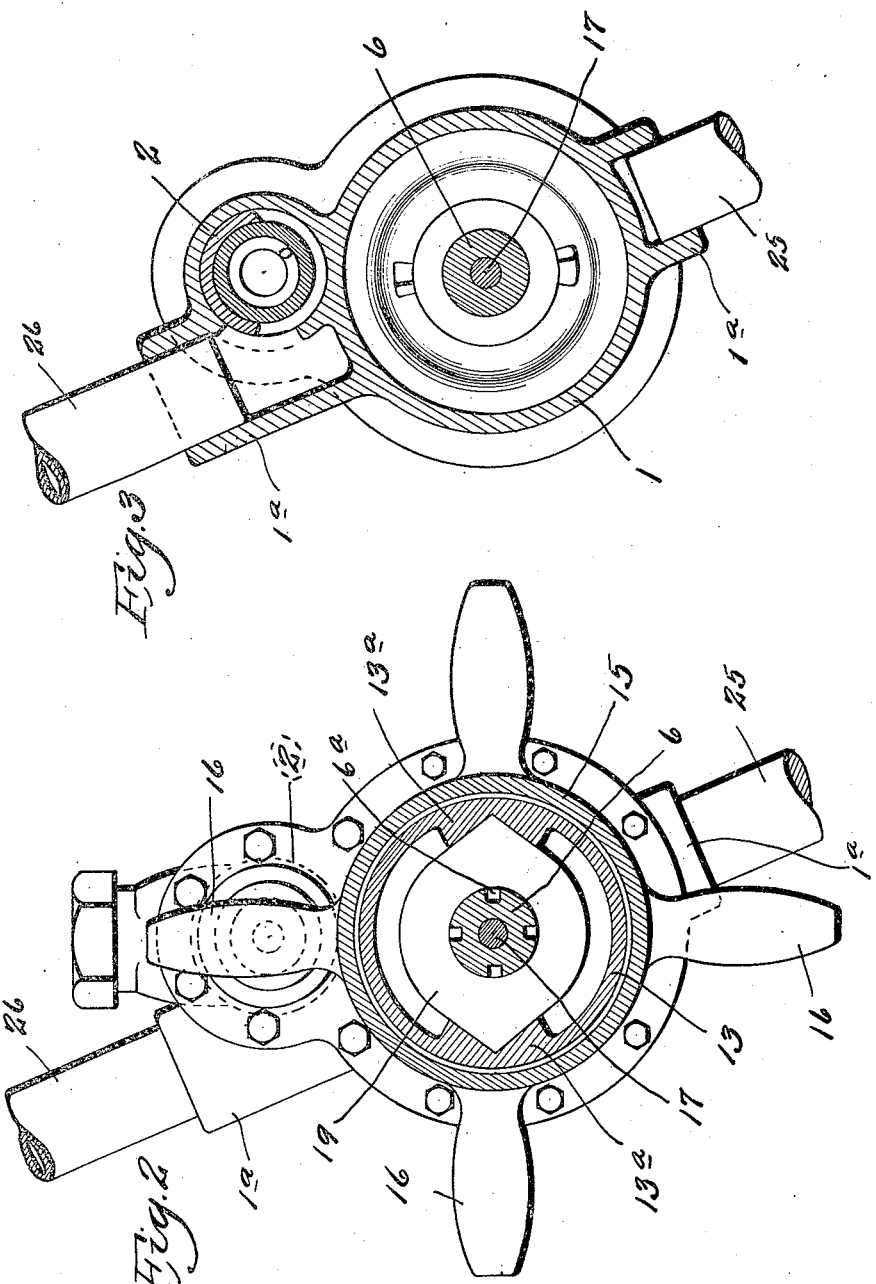

W. J. MACKLE.
MECHANICAL MOVEMENT.
APPLICATION FILED NOV. 14, 1919.

1,369,256.

Patented Feb. 22, 1921.

Inventor
William J. Mackle
By

UNITED STATES PATENT OFFICE.

WILLIAM J. MACKLE, OF ST. LOUIS, MISSOURI.

MECHANICAL MOVEMENT.

1,369,256. Specification of Letters Patent. Patented Feb. 22, 1921.

Original application filed April 7, 1919, Serial No. 290,800. Divided and this application filed November 14, 1919. Serial No. 338,068.

*To all whom it may concern:*

Be it known that I, WILLIAM J. MACKLE, a citizen of the United States, residing at city of St. Louis, State of Missouri, have invented a certain new and useful Improvement in Mechanical Movements, of which the following is a full, clear, and exact description, such as will enable others skilled in the art to which it appertains to make and use the same, reference being had to the accompanying drawings, forming part of this specification, in which—

Figure 1 is a longitudinal sectional view through my improved mechanical movement.

Fig. 2 is a cross sectional view on the line 2—2 of Fig. 1.

Fig. 3 is a cross sectional view on line 3—3 of Fig. 1.

Figure 4:
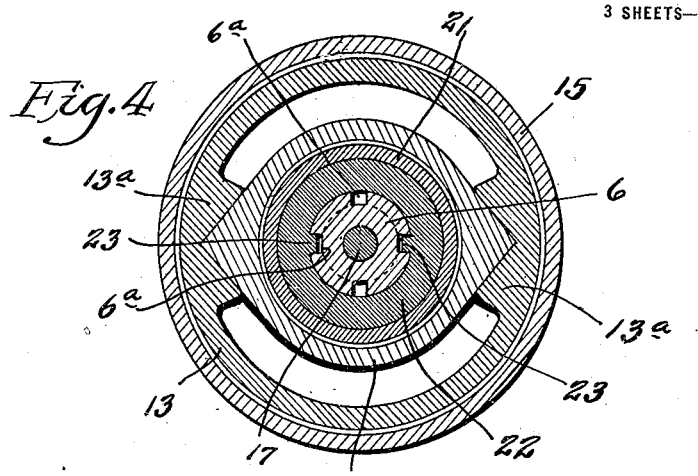
Fig. 4 is a sectional view on line 4—4 of Fig. 1.

This invention relates to a new and useful improvement in a mechanical movement designed especially for use in connection with the motor disclosed in my copending application filed April 7, 1919, Serial Number 290,800, and of which the present application is a division.

In the drawings, I have shown my improved mechanical movement as adapted for use in connection with a drill in which air or steam may be used as the motive power. The purpose of the present invention is to convert the reciprocating movement of the piston of the engine or motor into a rotary motion.

In the drawings, 1 indicates a flanged cylinder, preferably in the form of a casting having a valve chamber 2 located to one side thereof and which communicates with the bore of cylinder 1 by means of suitable openings 3 constituting ports in which operate parts of the valve-operating mechanism.

4 is the front cylinder head having a threaded boss 5 to which are secured packing nuts for packing the rotatable hollow shaft 6 and providing a bearing for the front end thereof. This casting 4 extends up to include the valve casing and is provided with an opening in which is arranged a hollow valve cap 7 through the opening in which passes the exhaust from the front end of the cylinder. 8 is a rear cylinder head having a similar extension for receiving a hollow valve cap 9 through the opening in which exhaust passes from the rear end of the cylinder.

10 is a hollow piston rod mounted upon the shaft 6, which shaft 6 may be designated as the driving shaft, the sleeve or hollow piston rod 10 being designed to slide longitudinally upon the driving shaft 6 while the latter rotates. 11 is a piston head secured in a suitable mounting, preferably by a threaded connection, to the forward end of the hollow piston rod 10, said piston head having the usual packing rings 12. The piston comprising the head and hollow rod 10 are intended to reciprocate within cylinder 1 and passing through the packing nut mounted on the rear cylinder head 8, the piston rod 10 extends into a chamber formed by a cylinder 13 secured to the rear cylinder head 8. This cylinder 13 is closed at its rear end by means of a head 14 and is exteriorly threaded to accommodate a capped sleeve 15 having handles 16 by which the drill may be fed, as when boring through metal and the point at the rear end of the cap piece is placed under what is known as a "lazy man".

The operation of this feeding mechanism is briefly this; the cap piece 15 is unscrewed gradually as the drill is being fed forward and the point at the rear end thereof engaging some stationary support will enable the operator to exert the necessary pressure on the drill and feed it forward.

17 indicates a rod mounted in the opening through the driving shaft 6, said rod having a round head seated in a recess in the head 14 and having its forward end arranged in such relation to the socket which receives the drill shank indicated by dotted lines X that, when the drill shank is home the rod 17 will be slightly displaced rearwardly, and in the event that the drill shank gets stuck in driving shaft 6, the sleeve 15 may be turned down to force the drill shank forwardly and loosen it. Of course, the sleeve 15, where the drill is operated manually, would be turned slightly back to permit the rear movement of the shaft 17 when the drill shank is inserted in the position to accomplish the above. The rear end of the main driving shaft 6 preferably engages the head 14 through the medium of the ball bearing to take up the end thrust and reduce friction.

Figures 5, 6:
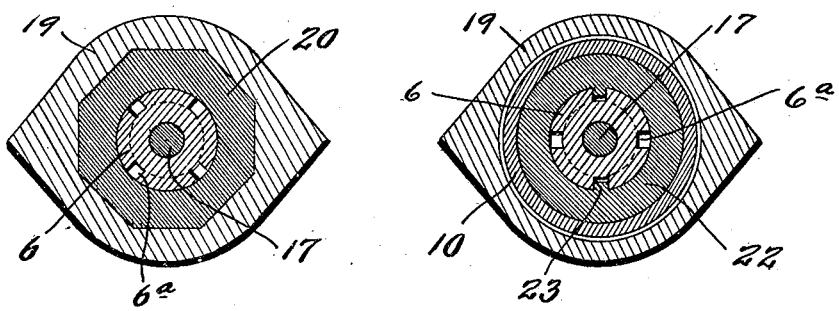
Fig. 5 is a sectional view on line 5—5 of Fig. 1.
Fig. 6 is a sectional view on line 6—6 of Fig. 1.
Figure 7:
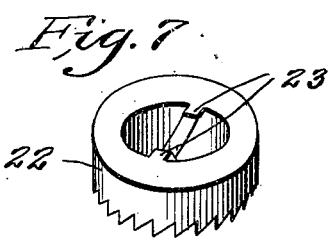
Fig. 7 is a detail view of one of the clutch members.
Figure 8:
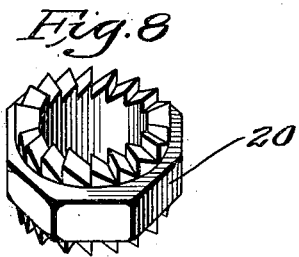
Fig. 8 is a detail view of another one of the clutch members.

The cylinder 13 constitutes an oil chamber, preferably provided with a lubricant to give a splash feed, and, as shown in Figs. 2 and 4, is provided with oppositely disposed guideways 13$^a$ in which is reciprocally mounted a cross-head 19. This cross-head has a medial inwardly extending non-circular flange (octagonal, as shown in Fig. 5) in which is slidingly mounted a double ratchet faced nut 20, shown in Fig. 8, which nut is provided with an opening through which the driving shaft 6 passes. The cross-head 19 has flanges extending in opposite directions from the medial inwardly extending flange just mentioned, in the forward one of which is threaded an offset flanged on the rear end of the piston rod 10, while in the rear flange is threaded a cap piece 21. This cap piece 21 and the offset flange of the piston rod 10 just referred to form seats or hangers for clutch members 22, see Fig. 1, and Fig. 7, the inwardly disposed faces of which are provided with ratchet teeth to coöperate with the double-faced ratchet nut 20. These clutch members 22 are likewise strung upon the main driving shaft 6. The inner faces of ratchet member 22 are provided with feathers or splines 23 oppositely pitched so as to engage and coöperate with spiral grooves 6$^a$ in the main driving shaft 6, and these clutch members are free to rotate within their respective chambers and they also have a slight movement longitudinally on shaft 6 sufficient to clear the teeth when they are disengaged from the double-faced ratchet nut. This double faced ratchet nut is held against longitudinal movement by the piston rod 10 and the cap piece 21 and, of course, is held against rotation within the cross-head 19 by the non-circular contour of its seat.

The operation of the parts above described in converting the reciprocating motion of the piston and its rod 10 to a rotary motion is briefly as follows: Assuming that the piston receives air or steam at one end while the other end is open to exhaust and vice versa and that it is caused to reciprocate, say at the rate of four or five hundred strokes per minute, the cross-head 19 being carried with it will also carry the clutch members 22 within their respective housings, the momentum of the piston at the end of each half stroke will cause these clutch members to alternately become engaged with and disengaged from the double faced ratchet, the engaged clutch member being rendered non-rotatable at the time of its engagement with the double faced ratchet will, by virtue of the inwardy extending splines, cause the shaft 6 to rotate. At the end of the half stroke, when the piston reverses its direction of movement the other clutch member will be thrown into engagement with the opposite face of the double faced ratchet and the first-mentioned clutch member will be thrown out of engagement and as the second mentioned clutch member has its splines oppositely pitched, i. e., pitched in a direction whereby on the reverse stroke of the piston, the driving shaft 6 through its second or oppositely pitched groove, will be driven in the same direction as that first above described with respect to the first mentioned clutch member. The purpose of providing the clutch members and the double faced ratchet with ratchet teeth is to enable the main driving shaft 6 to continue its rotation in the event that the piston ceases its operations at any time, as when the power is cut off. Assuming that the main shaft 6 extended forwardly and was provided with a balance wheel which by its momentum would continue the rotation of the main shaft after power had been shut off from the engine, the direction of rotation would be such that the clutch member in driving engagement therewith would be instantly disengaged and both clutch members idly spin with the shaft. These two clutch members are so related to the double-faced ratchet nut that there is just sufficient clearance between the teeth to enable them to idly rotate with the shaft.

Where the motor is used as a manually operable drill, the casting 1 is provided with lugs 1$^a$ (Fig. 2) in which are fitted handles 25 and 26, the latter of which may be in the form of a pipe having any suitable valve control and connected to a source of air or steam supply. The pipe 26 communicates with the valve chamber 2 in which is located a valve the details of which are shown in companion application referred to and form no part of this present invention.

Figure 9:
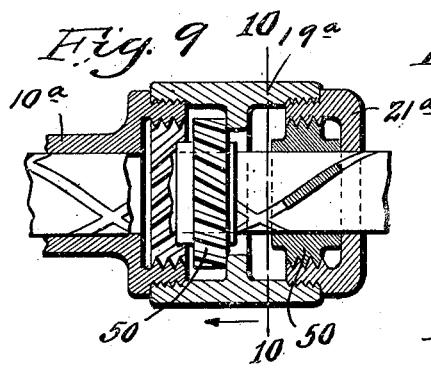
Fig. 9 is a longitudinal sectional view through a modified form.
Figure 10:
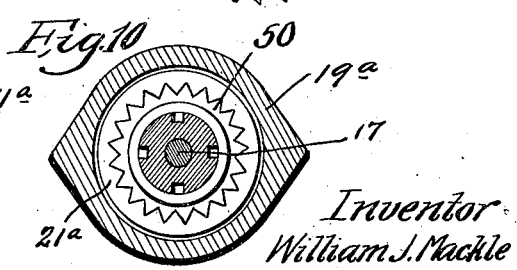
Fig. 10 is a sectional view on line 10—10 of Fig. 9.

In Figs. 9 and 10 is shown a modified form of mechanism for converting the reciprocating motion to a rotary motion in which I dispense with the use of a centrally arranged double faced ratchet fixed nut, and in lieu thereof employ two skew toothed members 50 splined to the spirally grooved shaft 6, the skew teeth of these members being designed to coöperate with skew teeth in the end of the hollow piston shaft 10$^a$ and the cap 21$^a$, as hereinbefore described, with respect to the ratchet members 22. The cross-head 19$^a$ is prevented from rotation and on the alternate strokes of the piston the skew-toothed members are successively brought into engagement with the piston rod 10ª and the cap member 21ª so as to lock the same to the cross-head 19ª and cause rotation of the shaft 6 continuously in the same direction.

I claim:

1. A motor comprising a reciprocating piston, valve mechanism therefor, and means for converting the reciprocating movement of the piston into a rotary motion, said means consisting of a cylinder, a cross-head slidingly mounted in said cylinder, clutch members loosely carried by the cross-head and a fixed nonrotatable double faced ratchet nut arranged in the cross-head and with which said clutch members coöperate.

2. A motor comprising a reciprocating piston and valve mechanism therefor, and means for converting the reciprocating motion of the piston into a rotary motion, said means consisting of a cylinder, a cross-head slidingly mounted in said cylinder and operated by the piston and held against rotary movement with respect to said cylinder, a double faced ratchet nut immovably held in said cross-head, clutch members loosely carried by said cross-head, and a driving shaft having a double pitched spiral groove with which said clutch members coöperate.

3. A portable motor comprising a reciprocating piston and valve mechanism therefor, in combination with a housing or casing directly connected to and extending from the rear end thereof, and in which one end of the piston rod connected to said piston extends, and means within said extension housing for converting the reciprocating motion of the piston into a rotary motion.

4. A portable motor comprising a reciprocating piston, a hollow piston rod connected thereto, means for converting the reciprocating motion of the piston and its connected rod into rotary motion and translating said rotary motion to a tool-carrying shaft arranged within said hollow piston rod, a tool-carrying shaft, and valve mechanism coöperating with said piston.

5. A motor comprising a cylinder, a reciprocating piston in said cylinder, a hollow piston rod connected to said piston, a housing or casing into which said hollow piston rod extends, a tool-carrying shaft extending entirely through said cylinder and seated against the rearmost head of said housing or casing, means for converting the reciprocating motion of said piston and translating it into rotary motion which is imparted to said shaft, and a valve mechanism for said piston.

6. A motor comprising a cylinder, a reciprocating piston and valve mechanism therefor in combination with a housing extending from one end of said cylinder and in which one end of the piston rod, connected to said piston in said cylinder, extends, mechanism within said housing for converting the reciprocating motion of the piston into rotary motion, a driving shaft coöperating with said converting mechanism, one end of which shaft is journaled in said housing, the opposite end extending through the forward end of the cylinder, a rod within said shaft, and means for feeding said rod forward.

7. A motor comprising a reciprocating piston and valve mechanism therefor, in combination with a threaded housing in which one end of the piston rod connected to said piston extends, mechanism within said housing for converting the reciprocating motion of the piston into rotary motion, a threaded sleeve adapted to engage stationary supports and coöperating with said housing, and means for rotating said sleeve and moving the housing longitudinally.

8. A motor comprising a cylinder, a housing mounted thereon, a driving shaft having a spiral groove, said shaft being mounted in said housing and extending through said cylinder, a piston rod loosely mounted upon said shaft, a piston connected to one end of said piston rod and arranged within said cylinder, a nonrotatable double faced ratchet member connected to the other end of said piston rod and located within said housing, single faced ratchet members loosely carried by said piston rod and adapted to engage said nonrotatable member, means carried by said single faced ratchet members and coöperating with the spiral groove on said driving shaft for rotating the same, and valve mechanism actuated by said piston whereby the piston is caused to reciprocate.

9. A motor comprising a cylinder, a reciprocating piston in said cylinder, valve mechanism therefor, a housing carried by said cylinder, a driving shaft journaled in said cylinder and housing, said drive shaft extending through the forward end of said cylinder and provided with a tool-socket in said forward end, and means for converting the reciprocating motion of the piston to a rotary motion of the driving shaft, said means consisting of guide-ways in said housing, a cross-head mounted in said guideways, a piston rod connecting said cross-head with the piston, a double-faced clutch member fixed within said cross-head, clutch members loosely carried within said cross-head and in engagement with said driving shaft and whose inwardly disposed faces are designed to coöperate with said double-faced member.

10. A motor comprising a cylinder, a hollow reciprocating piston, and valve mechanism therefor, a housing extending rearwardly from said cylinder and into which said piston extends, a double spirally grooved shaft extending through the front wall of said cylinder and into said housing, said shaft having a blind bearing against the rear wall of said housing, means for converting the reciprocating motion of the piston into a rotary motion of said shaft, said means consisting of an immovable double-faced clutch member located in said housing and carried by the piston, single faced clutch members loosely carried by said piston and also located in said housing and adapted to alternately engage in synchronism with the strokes of the piston, and means carried by said single-faced members coöperating with the spiral grooves of said shaft for causing a continuous rotary motion of said shaft in one direction.

11. A motor comprising a cylinder, a reciprocating piston and valve mechanism therefor, in combination with a housing or casing directly connected to and extending from the front end of said cylinder and in which one end of the piston rod connected to said piston extends, and means guided within said extension housing for converting the reciprocating motion of the piston into a rotary motion.

In testimony whereof I hereunto affix my signature, this 3d day of November, 1919.

WILLIAM J. MACKLE.